United States Patent [19]

Tada

[11] Patent Number: 4,961,616
[45] Date of Patent: Oct. 9, 1990

[54] OPTICAL SEMICONDUCTOR DEVICE
[75] Inventor: Katsuhisa Tada, Itami, Japan
[73] Assignee: Mitsubishi Denki Kabushiki Kaisha, Japan
[21] Appl. No.: 410,496
[22] Filed: Sep. 21, 1989
[30] Foreign Application Priority Data Jul. 13, 1989 [JP] Japan ................... 1-180966

[51] Int. Cl.⁵ .............................. G02B 6/32
[52] U.S. Cl. ......................... 350/96.2; 350/96.18
[58] Field of Search ............... 350/96.18, 96.15, 96.2, 350/96.21; 250/227; 357/17, 19, 30, 74, 80

[56] References Cited

U.S. PATENT DOCUMENTS 4,399,453  8/1983  Berg et al. ................... 350/96.2

FOREIGN PATENT DOCUMENTS 60-216315 10/1985 Japan .
61-128214  6/1986 Japan ................... 350/96.15
61-296308 12/1986 Japan ................... 350/96.15
62-150210  7/1987 Japan ................... 350/96.15
63-169604  7/1988 Japan .

OTHER PUBLICATIONS

Mitsubishi InGaAs Photodiodes—PD7035, Mar. 1989.

Primary Examiner—John D. Lee
Assistant Examiner—John Ngo
Attorney, Agent, or Firm—Leydig, Voit & Mayer

[57] ABSTRACT

An optical semiconductor device includes an optical semiconductor element which may be a light emitting element or a light receiving element, enclosed within a lensed-cap including a cap with a lens attached to it. A thread is formed on the outer surface of the lensed-cap so that the lensed-cap can be threaded into a housing having a corresponding thread on its inner wall. The optical semiconductor device is threaded into the housing to form a module.

17 Claims, 4 Drawing Sheets

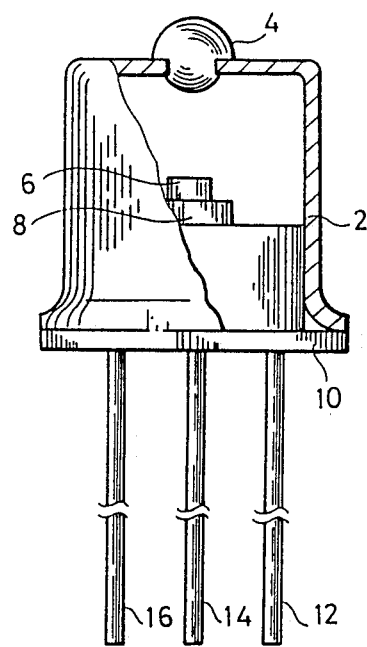
FIG. 1 PRIOR ART
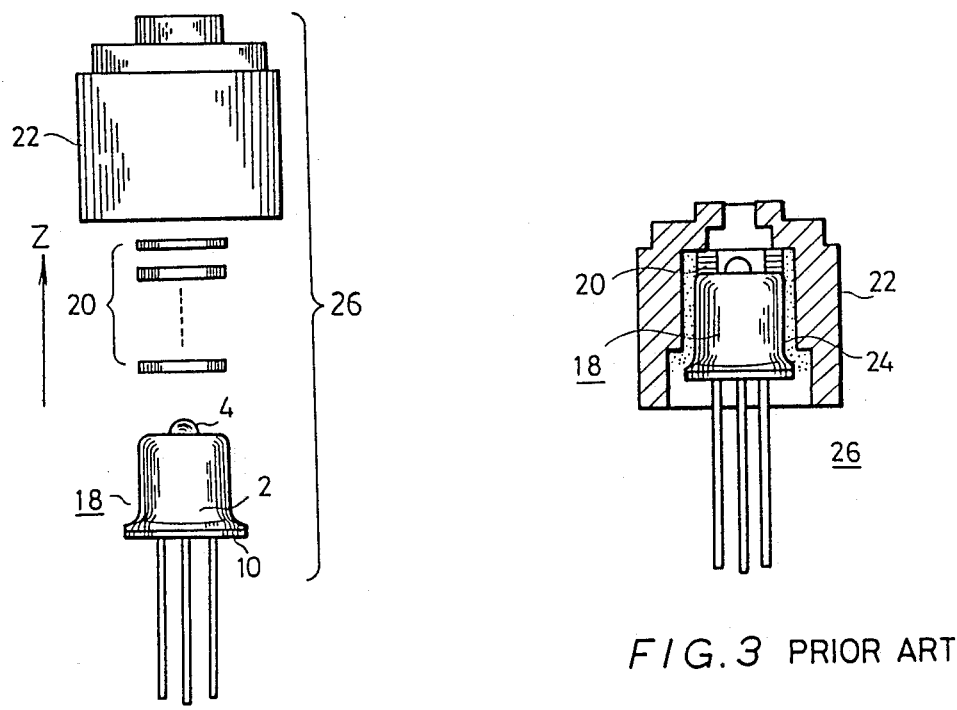
FIG. 3 PRIOR ART
FIG. 2 PRIOR ART

OPTICAL SEMICONDUCTOR DEVICE

FIELD OF THE INVENTION

The present invention relates to an optical semiconductor device comprising a light receiving element, such as a photodiode, or a light emitting element, such as a light emitting diode, enclosed in a cap with a lens attached to it. More particularly, according to the present invention, such an optical semiconductor device including a cap has a thread in its outer surface which is screwed into a threaded inside surface of a housing in which the device is to be housed, whereby positional adjustment of the optical semiconductor device for controlling its sensitivity is facilitated.

BACKGROUND OF THE INVENTION

A conventional optical semiconductor device is formed into a module by telescopically inserting it into a housing. Therefore, in order to adjust the axial position of the optical semiconductor device within the housing, washer-like spacers must be placed in the housing. This adjustment of the axial position of the semiconductor device is necessary in order to adjust the sensitivity of the optical semiconductor device module. For that purpose, the number of the spacers inserted between the housing inner surface and the optical semiconductor device is adjusted to change the axial position of the semiconductor device, while monitoring its sensitivity, during the fabrication of an optical semiconductor device module. Accordingly, fabrication of optical semiconductor modules has been a troublesome work.

Japanese Published Patent Application No. SHO 60-216315 discloses an assembly in which optical elements including an optical-fiber holder, a columnar rod-lens and a reflector mirror are housed in a cylindrical container. These optical elements are fixed in position in the container by means of a threaded lid that is screwed into an open end of the container with a corresponding thread formed on its inside surface. The assembly disclosed in this Japanese patent publication includes means for pressing the optical elements into the container for fixing them in position, but not to adjust the axial position of the elements.

Japanese Published Patent Application No. SHO 63-169604 discloses a connection of an optical fiber to an optical link by engaging a thread on the cladding of the optical fiber with a thread formed in the inner surface of a connector-terminal element provided in the optical link. The object of the invention of this publication, however, is to connect the optical fiber with a light emitting or light receiving element, keeping them in mechanical, intimate contact with each other, and not the distance of the light emitting or light receiving element from the optical fiber.

SUMMARY OF THE INVENTION

According to the present invention, an optical semiconductor device includes a cylindrical cap with a lens attached to it. A thread is formed in the outer surface of the cap for engaging a thread formed in the inside wall of a housing for housing the optical semiconductor device. (Hereinafter, such an optical semiconductor device is referred to as "lens-capped" optical semiconductor device, and such a cap is referred to as "lensed-cap".) In order to form such a lens-capped optical semiconductor device into a module in a housing, an electrically conductive bonding agent, for example, is first applied over the threaded outer side surface of the lensed-cap, the lensed-cap is threaded into the housing, while monitoring the sensitivity of the optical semiconductor device, and the threading is stopped at a position where an optimum sensitivity is attained, so that the lens-capped optical semiconductor device is secured in position by means of the bonding agent.

BRIEF DESCRIPTION OF THE DRAWING FIGURES

In the accompanying drawings,

FIG. 1 is a partially broken away, side view of an example of a conventional optical semiconductor device;

FIG. 2 is a side view illustrating how the conventional optical semiconductor element is assembled with a housing into a module;

FIG. 3 is a partially sectional, side view of the module comprising a conventional optical semiconductor element housed in a housing;

Figure 7A:
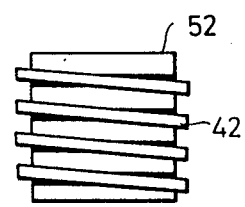
Figure 7B:
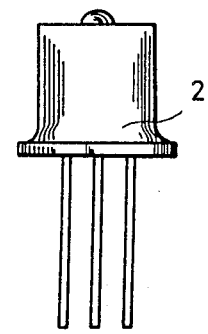

FIGS. 7(a) and 7(b) show another embodiment of the present invention; and

Figure 5:
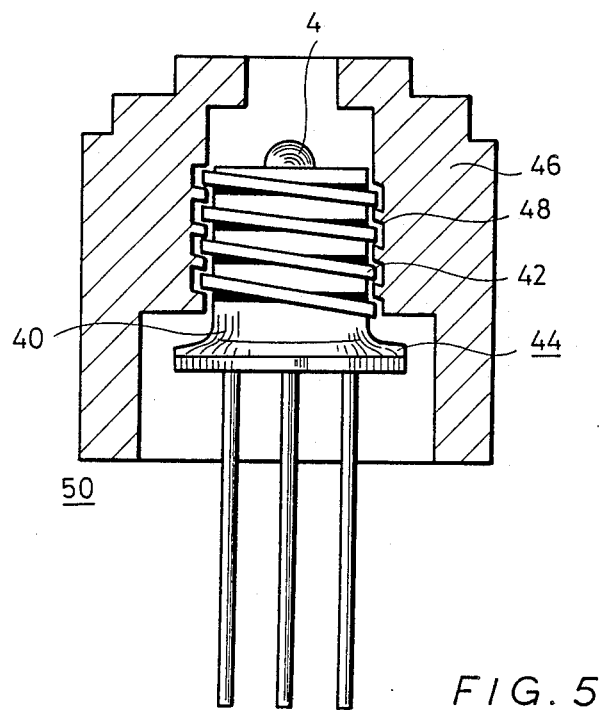
FIG. 5 is a partially sectional, side view of a module comprising the optical semiconductor device of FIG. 4 engaging a housing.
Figure 8A:
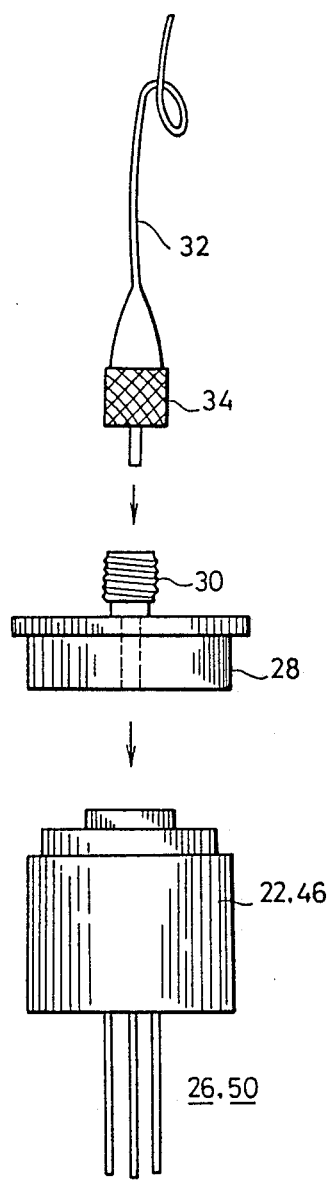
Figure 8B:
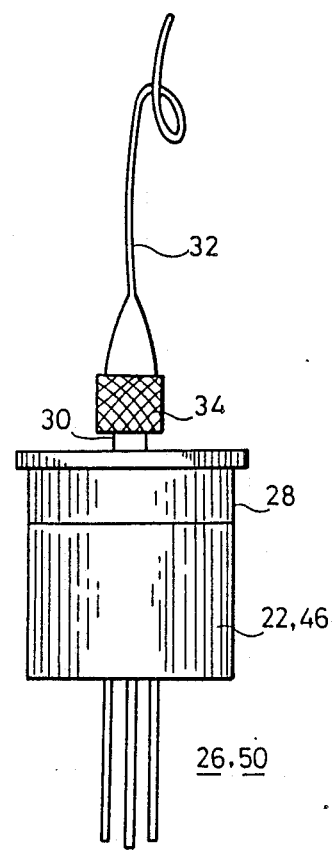

FIGS. 8(a) and 8(b) schematically illustrate how an optical semiconductor device module in general, such as the ones shown in FIGS. 3 or 5, is coupled to an optical fiber via a receptacle.

DETAILED DESCRIPTION OF THE PREFERRED EMBODIMENTS

Before explaining an optical semiconductor device according to the present invention, structures and problems of conventional devices are first described with reference to the accompanying drawings.

In FIG. 1, there is illustrated a conventional lens-capped optical semiconductor device with a portion of its cap shown cut away. Referring to FIG. 1, a glass-ball lens 4 is fixed in an end wall closing one end of a cylindrical cap 2 which has no irregularities in its side surface. The cap 2 is formed, for example, of Kovar plated with nickel (Ni) as an underlying layer which, in turn, is plated with gold (Au). The glass-ball lens 4 is formed, for example, of Kovar glass having an index of refraction n of 1.487. An optical semiconductor element 6 such as, for example, a photodiode, is coupled via a mount 8 to a stem 10 which is secured to the cap 2. Usually, the stem 10 and the cap 2 are hermetically sealed by welding in a nitrogen stream. The purpose of carrying out the welding in a nitrogen stream is to prevent characteristic degradation of the optical semiconductor device during its operation. One of three leads 12, 14 and 16 mounted on the stem 10 is electrically connected to the stem 10 and the cap 2 for grounding them, and the other two leads are connected to respective electrodes of the photodiode 6. For example, as the photodiode 6, an InGaAs pin photodiode may be used, which is suitable for receiving light in a range of wavelengths of from 1000 nm to 1600 nm and has a diameter of an effective light receiving area of about 80 μm.

FIG. 2 illustrates how the conventional lens-capped optical semiconductor device is fixed in position in a housing to form a module, and FIG. 3 shows a completed optical semiconductor device module. A lens-capped optical semiconductor device 18 of FIG. 2 is of the structure shown in FIG. 1 and is assembled with a housing 22 into a module, with a number of position adjusting spacers 20 disposed between the inner wall of the housing and the optical semiconductor device 18. Each of the spacers 20 may have, for example, a washer-like shape having a thickness of about 0.125 mm. When assembling a module, an electrically conductive adhesive, for example, is applied to the side surface of the cap 2. Then, monitoring the sensitivity of the optical semiconductor device 18, the number of the spacers 20 is changed to adjust the position of the device 18 in the direction indicated by an arrow Z so that optimum sensitivity is obtained. Thus, an optical semiconductor device module 36 having a structure as shown in FIG. 3 results. As is understood from FIG. 3, the optical semiconductor device 18 and the housing 22 are bonded by the conductive adhesive 24 filling the space between the device 18 and the housing 22.

The optical semiconductor device module 36 shown in FIG. 3 is used in a manner as illustrated in FIGS. 8(a) and 8(b). Specifically, a receptacle 28 is welded to the housing 22 of the optical semiconductor device module 26, and a coupling 30 of the receptacle 28 and a coupling 34 provided at the tip end of the optical fiber 32 are brought into threaded engagement with each other. Thus, the optical semiconductor device module 26 and the optical fiber 32 are optically coupled as shown in FIG. 8(b).

When the above-stated conventional lens-capped optical semiconductor device 18 is inserted into the housing 22, it is necessary to add or remove spacers 20 or from the housing 22 in order to adjust the sensitivity, which makes the module assembling work troublesome. Furthermore, when an adhesive is applied over the side surface of the cap 2 and the capped device 18 is inserted into the housing 20 after the positional adjustment has been made for optimum sensitivity, the adhesive may enter spaces between adjacent spacers or into the space between the end wall of the cap 2 and the spacer, so that the position in the direction Z of the optical semiconductor device 18 and, hence, its sensitivity may change.

According to the present invention, the above-stated problems present in the conventional devices are eliminated, so that when a lens-capped optical semiconductor device is assembled into a module, its positional adjustment for adjusting its sensitivity can be done very easily.

Figure 4:
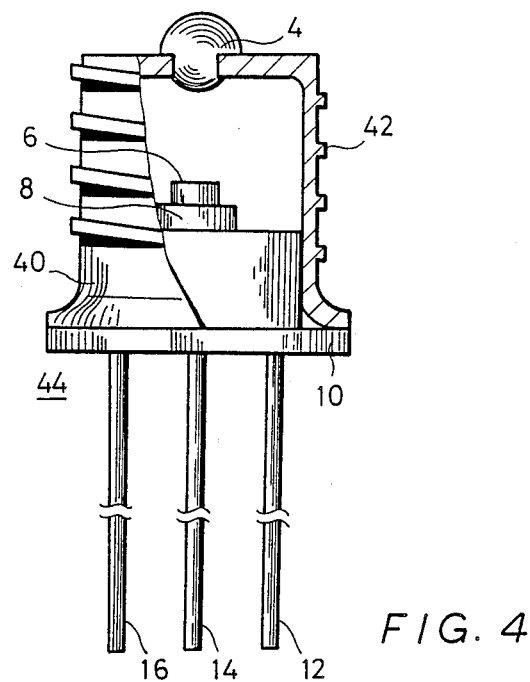
FIG. 4 is a partially sectional, side view showing the structure of an optical semiconductor device according to a first embodiment of the present invention.

FIG. 4 shows a lens-capped optical semiconductor device 44 according to one embodiment of the present invention. A lensed-cap 40 is shown partially cut away. A thread 42 is formed in the outer side surface of the cap 40 with a glass-ball lens 4 mounted on the closing end wall. The thread 42 is formed to engage a thread formed in the inside surface of a housing which is described later. Like the cap 2 of the conventional optical semiconductor device shown in FIG. 1, the cap 40 may be formed of Kovar plated with nickel to form an underlying layer which is in turn plated with gold. Similarly, Kovar glass having an index of refraction n of of 1.487 may be used as the material of the glass-ball lens 4. An optical semiconductor element 6, such as, for example, a photodiode, is mounted on a stem 10 via a mount 8 disposed therebetween and is coupled to the cap 40, and the stem 10 is bonded to the cap 40. In order to prevent the characteristics of the optical semiconductor device 18 from degrading during operation, the cap 40 and the stem 10 are joined by welding in a stream of nitrogen. One of three leads mounted to the stem 10 is electrically connected to the stem 10 and the cap 40, and the remaining two leads are electrically connected to respective electrodes of the photodiode 6. As the photodiode 6, an InGaAs pin photodiode, for example, may be used, which is suitable for receiving light having a wavelength in a range of from 1000 nm to 1600 nm and which has a diameter of an effective light receiving area of about 80 μm. Needless to say, in place of a light receiving element such as a photodiode, a light emitting element such as a light emitting diode can be used as the optical semiconductor element 6.

FIG. 5 shows a module 50 formed by incorporating the lens-capped optical semiconductor device 44 shown in FIG. 4 with a housing 46. The inner wall surface of the housing 46 is provided with a thread 48 which engages the thread 42 of the cap 40. The housing 46 is formed of, for example, gold, stainless steel or aluminum. Prior to threading the lens-capped optical semiconductor device 44 into the housing 46, a securing agent such as, for example, an adhesive, preferably an electrically conductive adhesive, is applied over the surface of the thread groove of the cap 40. While monitoring the sensitivity of the lens-capped optical semiconductor device 44, the device 44 is threaded into the housing 46, and when an optimum sensitivity is attained the threading of the device 44 is stopped so that it is secured to the housing 46 by means of the adhesive applied over the thread groove of the cap 40. Thus, the module 50 shown in FIG. 5 is completed.

A receptacle 28 like the one shown in FIG. 8 is welded to the housing 46. A coupling 30 provided on the receptacle 28 is brought into engagement with a coupling 34 of an optical fiber 32. Thus, the optical semiconductor device module 50 is coupled to the optical fiber 32.

Figure 6:
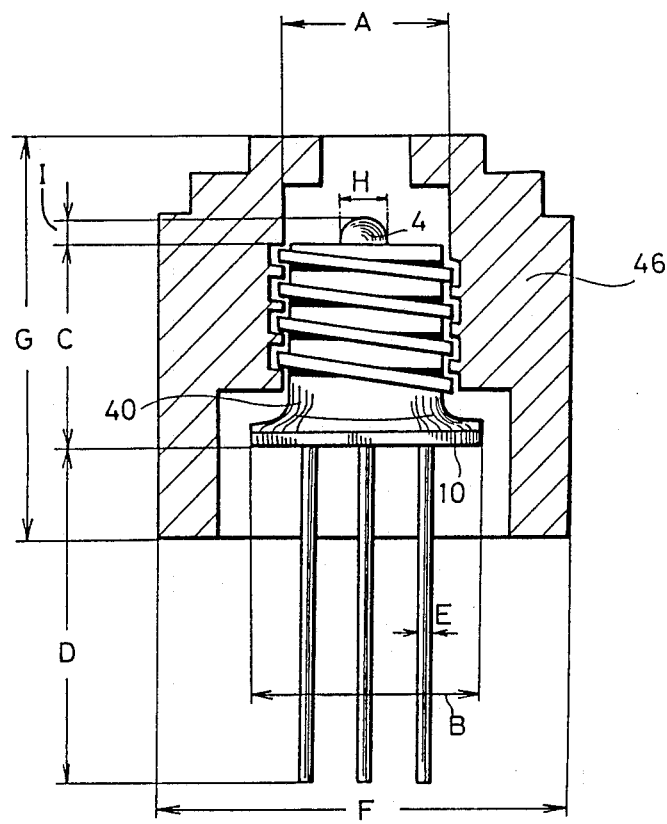
FIG. 6 is a partially sectional, side view exemplifying various dimensions of the optical semiconductor device module of FIG. 5.

FIG. 6 illustrates the dimensions of various sections of the optical semiconductor device module shown in FIG. 5, in which A is the outer diameter of the cap 40; B is the outer diameter of the lower end portion of the cap 40 (i.e. the diameter of the stem 10); C is the height of the cap 40; D is the length of the leads 12, 14 and 16; E is the thickness of the leads; F is the outer diameter of the housing 46; G is the height of the housing 46; H is the diameter of the glass-ball lens 4; and I is the height of the lens 4 above the end wall surface of the cap 40. Examples of the respective dimensions are as follows.

A: 4.7±0.2 mm
B: 5.4±0.2 mm
C: 3.8±0.3 mm
D: 15±1 mm
E: 0.45 mm
F: about 7.8 mm
G: about 6.9 mm
H: 1.5±0.1 mm
I: 0.7±0.15 mm The leads 12, 14 and 16 are arranged on a circle having a diameter of about 2.54 mm with an angular spacing of 90° from each other.

FIGS. 7(a) and 7(b) show another embodiment of the present invention. The lens-capped optical semiconductor device according to this embodiment comprises an optical semiconductor device having a conventional structure shown in FIG. 1 and a threaded cylindrical member 52 fitted over the cap 2 of the optical semiconductor device. The cylindrical member 52 may be shrink-fitted on the cap 2, or it may be bonded by an adhesive, such as an electrically conductive adhesive, to the cap 2. The lens-capped optical semiconductor device with the threaded cylindrical member 52 fitted thereover is threaded into a housing to form a module, as in the case of the first embodiment.

As stated above, according to the present invention, when a lens-capped optical semiconductor device is assembled into a module, no troublesome adding or removing spacers into or from a housing as done in conventional techniques, is required for adjusting the sensitivity of the optical semiconductor device. According to the present invention, the assembly of a module can be completed in a simple manner by applying a bonding agent, such as an adhesive, over the outer surface of the cap of the device and, while monitoring the sensitivity of the device, threading the device into a housing until optimum sensitivity is attained. The semiconductor device is held in that position so that it is fixed to the housing by the adhesive which has been applied over the cap. Thus, the assembly of modules can be completed in a very simple manner. Further, the sensitivity of the device never changes after the module is completed. Furthermore, the lens-capped optical semiconductor device and the housing assembled into a module will never be separated from each other even if a mechanical schock is applied to the module, because they are joined not only by an adhesive but also by the threaded engagement.

What is claimed is:

1. A packaged light-interactive semiconductor device comprising:
    a light-interactive semiconductor element;
    a stem on which the semiconductor element is mounted;
    a metal cap attached to the stem and enclosing the semiconductor element, the cap including a generally cylindrical outer surface and a top surface with a lens mounted in the top surface opposite the semiconductor element; and
    a generally cylindrical electrically conductive sleeve disposed around and secured to the outer surface including a device thread for threadedly engaging a housing having a complementary housing thread.

2. The packaged semiconductor device according to claim 1 wherein said semiconductor element is a light responsive element.

3. The packaged semiconductor device according to claim 2 wherein said light responsive element is a photodiode.

4. The packaged semiconductor device according to claim 1 wherein said semiconductor element is a light emitting element.

5. The packaged semiconductor device according to claim 4 wherein said light emitting element is a light emitting diode.

6. The packaged semiconductor device according to claim 1 wherein the device thread is an external thread.

7. The packaged semiconductor device according to claim 1 comprising a housing including a housing thread complementary to the device thread and engaging the device thread.

8. The packaged semiconductor device according to claim 7 including an adhesive disposed within the engaged device and housing threads fixing the positions of the cap and housing relative to each other.

9. The packaged semiconductor device according to claim 8 wherein the adhesive is electrically conductive.

10. A mounted, packaged light-interactive semiconductor device comprising:
    a light-interactive semiconductor element;
    a stem on which the semiconductor element is mounted;
    a cap attached to the stem and enclosing the semiconductor element, the cap including an outer surface on a which a device thread for threadedly engaging a housing including a complementary thread is disposed;
    a housing including a housing thread complementary with the device thread and threadedly engaging the device thread; and
    an adhesive disposed within the engaged device and housing threads fixing the positions of the cap and housing relative to each other.

11. The mounted, packaged semiconductor device module according to claim 10 wherein said semiconductor element is a light responsive element.

12. The mounted, packaged semiconductor device module according to claim 11 wherein said light responsive element is a photodiode.

13. The mounted, packaged semiconductor device module according to claim 10 wherein said semiconductor element is a light emitting element.

14. The mounted, packaged semiconductor device module according to claim 13 wherein said light emitting element is a light emitting diode.

15. The mounted, packaged light-interactive semiconductor device according to claim 10 wherein the cap includes a generally cylindrical sleeve disposed around and secured to the cap and the device thread is disposed on the sleeve.

16. The mounted, packaged light-interactive semiconductor device according to claim 10 wherein the device thread is an external thread and the housing thread is an internal thread.

17. The mounted, packaged semiconductor device module according to claim 10 wherein said adhesive is electrically conductive.

* * * * *